United States Patent
Weksler et al.

(10) Patent No.: US 10,416,856 B2
(45) Date of Patent: Sep. 17, 2019

(54) HANDEDNESS FOR HAND-HELD DEVICES

(71) Applicant: Lenovo (Singapore) Pte. Ltd., Singapore (SG)

(72) Inventors: Arnold S. Weksler, Raleigh, NC (US); Nathan J. Peterson, Durham, NC (US); Russell Speight VanBlon, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 151 days.

(21) Appl. No.: 14/164,767

(22) Filed: Jan. 27, 2014

(65) Prior Publication Data
US 2015/0212699 A1 Jul. 30, 2015

(51) Int. Cl.
*G06F 3/0484* (2013.01)
*G06F 3/0481* (2013.01)
*G06F 3/0482* (2013.01)
*G06F 3/0487* (2013.01)
*G06F 3/0488* (2013.01)
*G06F 3/01* (2006.01)
*G06F 3/0346* (2013.01)
*G06F 3/041* (2006.01)

(52) U.S. Cl.
CPC .......... *G06F 3/04842* (2013.01); *G06F 3/011* (2013.01); *G06F 3/0482* (2013.01); *G06F 3/0487* (2013.01); *G06F 3/0488* (2013.01); *G06F 3/04817* (2013.01); *G06F 3/0346* (2013.01); *G06F 3/0416* (2013.01); *G06F 3/04886* (2013.01)

(58) Field of Classification Search
CPC .. G06F 3/0488; G06F 3/04886; G06F 3/0346; G06F 3/0416; G06F 3/011; G06F 3/04842; G06F 3/04817; G06F 3/0482; G06F 3/0487
USPC ........................................................ 715/765
See application file for complete search history.

(56) References Cited

U.S. PATENT DOCUMENTS

| | | | |
|---|---|---|---|
| 6,396,477 B1 * | 5/2002 | Hinckley et al. | 345/163 |
| 6,956,564 B1 * | 10/2005 | Williams | 345/179 |
| 8,631,358 B2 * | 1/2014 | Louch | 715/866 |
| 2005/0154798 A1 * | 7/2005 | Nurmi | 710/1 |
| 2005/0219228 A1 * | 10/2005 | Alameh et al. | 345/173 |
| 2010/0013780 A1 * | 1/2010 | Ikeda | G06F 3/04883 345/173 |
| 2010/0134423 A1 * | 6/2010 | Brisebois et al. | 345/173 |
| 2013/0019192 A1 * | 1/2013 | Itoh | G06F 3/048 715/765 |
| 2013/0093680 A1 * | 4/2013 | Ogita | 345/168 |
| 2013/0222668 A1 * | 8/2013 | Anderson | H04N 5/23293 348/333.08 |
| 2013/0271375 A1 * | 10/2013 | Griffin | G06F 3/0237 345/168 |

(Continued)

*Primary Examiner* — Ting Z Lee
(74) *Attorney, Agent, or Firm* — Ference & Associates LLC

(57) ABSTRACT

An aspect provides a method, including: receiving one or more sensor inputs at an information handling device; determining, using a processor, that a user is holding the information handling device with a particular hand based on a holding orientation derived via the one or more sensor inputs; and adjusting output to a touch screen of the information handling device based on the particular hand determined. Other aspects are described and claimed.

20 Claims, 3 Drawing Sheets

(56) References Cited

U.S. PATENT DOCUMENTS

| | | | |
|---|---|---|---|
| 2014/0082514 A1* | 3/2014 | Sivaraman et al. | 715/745 |
| 2014/0111451 A1* | 4/2014 | Park | G06F 3/0488 345/173 |
| 2014/0208333 A1* | 7/2014 | Beals | G06F 9/542 719/318 |
| 2015/0192989 A1* | 7/2015 | Kim | G06F 3/011 345/156 |
| 2015/0193112 A1* | 7/2015 | Tagaya | G06F 3/0488 715/765 |

* cited by examiner

HANDEDNESS FOR HAND-HELD DEVICES

BACKGROUND

Information handling devices ("devices") come in a variety of forms, for example tablet computing devices, smart phones, e-readers, and the like. Commonly touch input interfaces, e.g., touch screens, are utilized for providing user inputs.

Smaller, hand-held devices are often operated by users with a single hand. Users often choose a particular hand with which to hold and manipulate the device based on the user's handedness. Given the particular hand chose by the user, certain locations and functions (e.g., application icons to be launched from a home screen) may be cumbersome to reach or perform.

BRIEF SUMMARY

In summary, one aspect provides a method, comprising: receiving one or more sensor inputs at an information handling device; determining, using a processor, that a user is holding the information handling device with a particular hand based on a holding orientation derived via the one or more sensor inputs; and adjusting output to a touch screen of the information handling device based on the particular hand determined.

Another aspect provides an information handling device, comprising: one or more device sensors; a touch screen; a processor operatively coupled to the touch screen and the one or more device sensors; a memory device that stores instructions accessible to the processor, the instructions being executable by the processor to: receive one or more sensor inputs; determine that a user is holding the information handling device with a particular hand based on a holding orientation derived via the one or more sensor inputs; and adjust output to a touch screen of the information handling device based on the particular hand determined.

A further aspect provides a product, comprising: a storage device having processor executable code stored therewith, the code comprising: code that receives one or more sensor inputs at an information handling device; code that determines, using a processor, that a user is holding the information handling device with a particular hand based on a holding orientation derived via the one or more sensor inputs; and code that adjusts output to a touch screen of the information handling device based on the particular hand determined.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
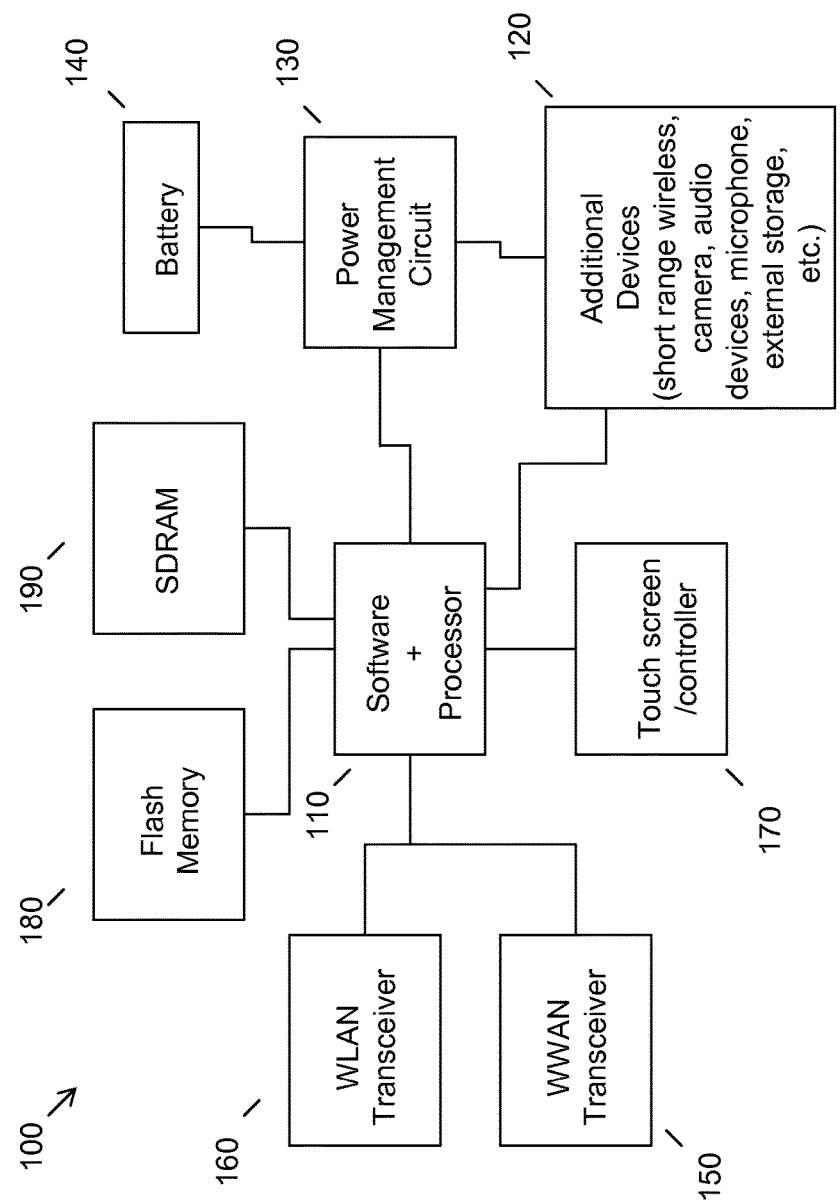
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As experienced by users operating a hand-held device with a single hand, given the particular hand chosen by the user, certain functions (e.g., application icons on a home screen) may be cumbersome to perform. Hand-held devices would function more appropriately if they could determine which hand is holding the device. For example, given this information, a device may optimize how and what it displays for the user, e.g., on a touch screen display. Thus, if the device is being held in the left hand, then the major icons (e.g., most frequently used, etc.) may be displayed close to the left side of the device so that the left thumb can easily access. Certain devices allow the user manually configure a static handedness setting in some respects, e.g., for left or right handed mouse use.

An embodiment, however, permits a device itself to determine which hand a user is holding the device with and permits the adjustment of output, e.g., on a touch screen, in view thereof. In an embodiment, tilt angle and/or other orientation information is used to determine with which hand the user is holding the device.

For example, due to the fact that there is a normal parallax that exists when users hold a device with the left or right hand, e.g., while bringing the device toward the user's eyes, the device is slightly angled. This angle is observed to be opposite from the hand that is being used. For example, the device is slightly angled to the right when used by the left hand and slightly to the left when used by the right hand. This can be used to quickly and reliably determine which hand the device is being held by. In small cases, e.g., when the angle is intentionally changed, the user can configure the device to use either an average of the measurements, use the previous setting, or provide for a gesture to indicate the handedness. In an embodiment, the handedness setting may be changed dynamically, e.g., when the user switches hands.

In an embodiment, the handedness setting may persist, e.g., when a user changes the tilt angle without changing hands.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included. System 100 often includes a touch screen 170 for data input and display/rendering. System 100 also typically includes various memory devices, for example flash memory 180 and SDRAM 190.

Figure 2:
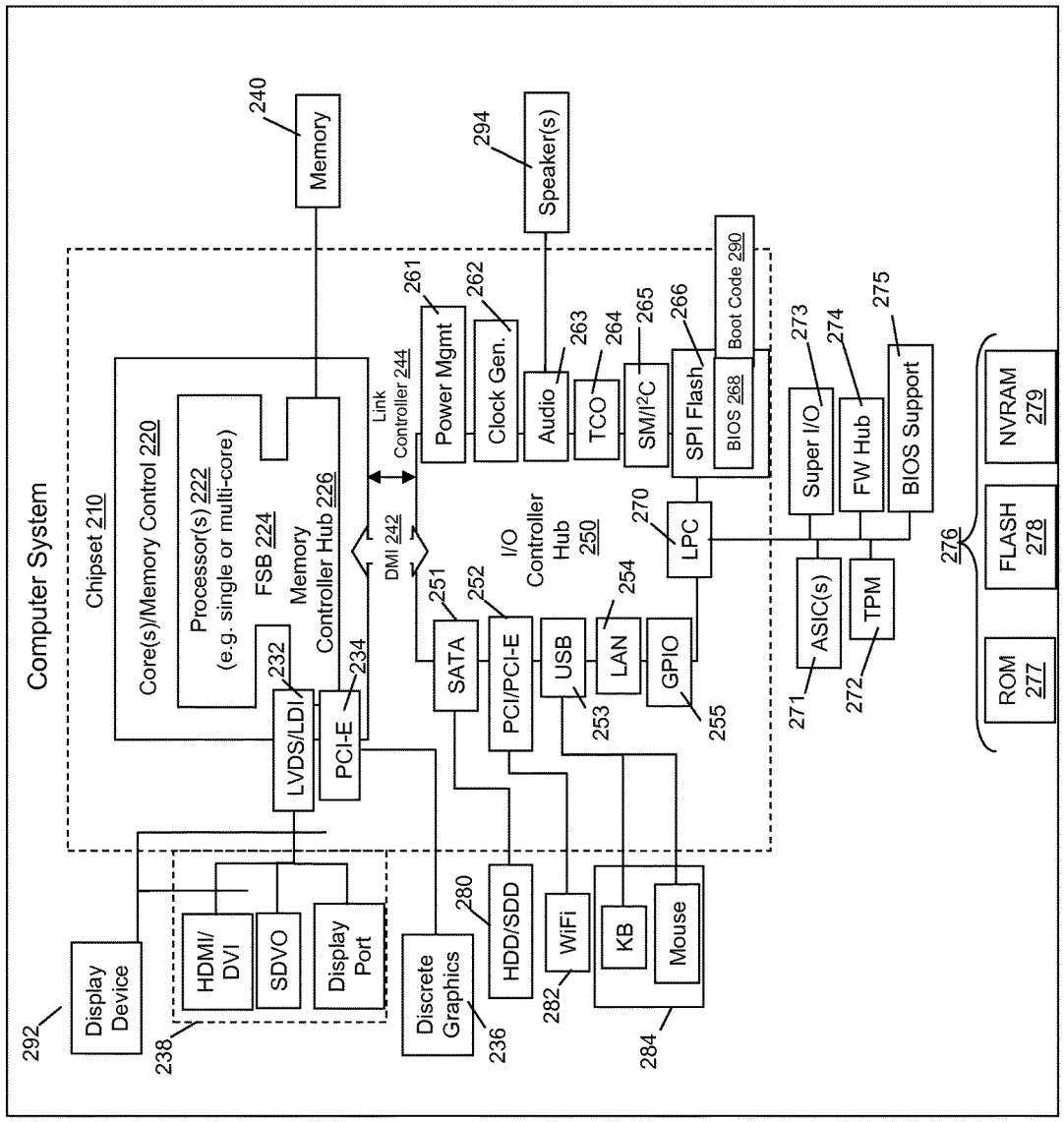
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices such as tablet computers, smart phones, or other hand held devices. In an embodiment, the device may determine with which hand the user is holding the device and adjust the output to the display accordingly. This permits the device to adapt, e.g., the touch input interface, to the user's preferred or currently used hand.

Figure 3:
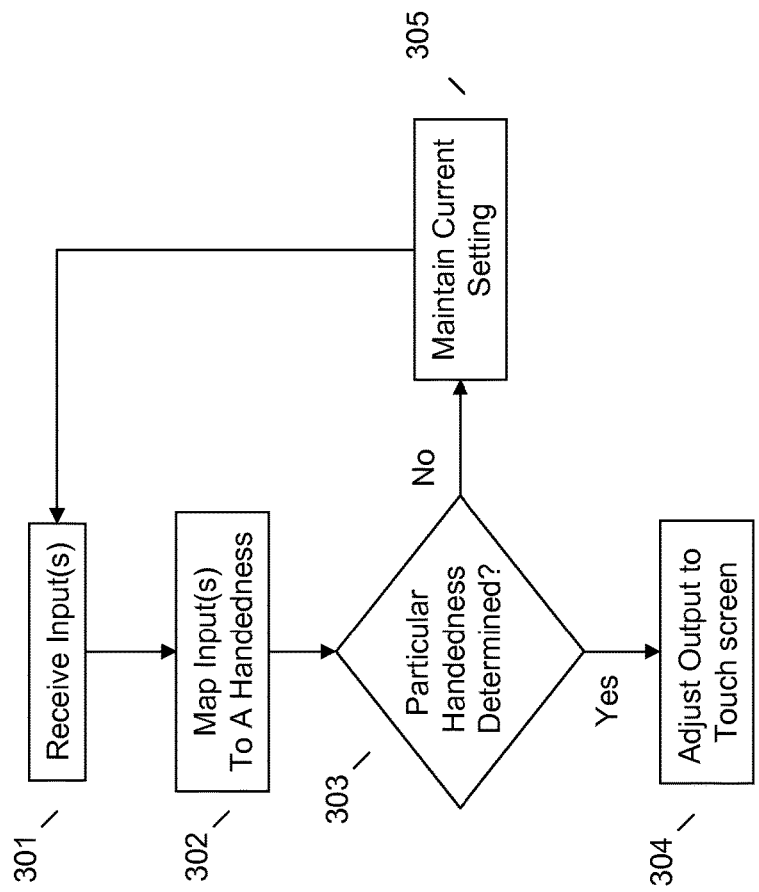
FIG. 3 illustrates an example of determining handedness for hand-held devices.

Referring to FIG. 3, an embodiment may determine the hand with which a user is holding the device and adjust the touch interface by, e.g., repositioning or reorganizing icons within a touch screen display, by using device sensor inputs. An embodiment receives inputs at 301, e.g., from a device orientation sensor such as an accelerometer or a gyroscope or suitable like sensor (e.g., a compass) or combination of sensors. These inputs may be used to derive or calculate a tilt angle for the device. It should be noted that other sensors (and inputs thereof) may be utilized, e.g., contact based sensors, visual sensor such as a camera, etc.

An embodiment uses these sensor inputs to determine or infer the hand with which the user is holding the device. For example, an orientation sensor may provide inputs that may be utilized to determine an angle of tilt (with respect to some reference point or device orientation). This tilt angle information may be mapped to predetermined handedness settings, e.g., the tilt angle may be used to determine which hand the user is holding the device with and thereafter to make appropriate adjustments to the touch interface.

For example, due to the fact that there is a normal parallax that exists when users hold a device with the left or right hand, e.g., while bringing the device toward the user's eyes, the device is slightly angled. This angle is observed to be opposite from the hand that is being used. Thus, the device is slightly angled to the right when used by the left hand and slightly to the left when used by the right hand. This can be used to quickly and reliably determine which hand the device is being held by.

Thus, the received inputs are mapped or matched to predetermined handedness characteristics at 302. This permits an embodiment to determine, e.g., responsive to a match between the received sensor input(s) and the handedness characteristics, as determined at 303, which hand the user is holding the device with. If a particular hand is determined at 303, an embodiment may thereafter adjust the output to the touch screen at 304, e.g., adjusting touch screen interface settings for repositioning or reorganizing the icons on a home screen. If a particular handedness cannot be determined at 303, an embodiment may maintain a current or default setting at 305, which may persist until further information regarding handedness is available.

It should be noted that the determining of handedness and/or the adjustment of output to the display screen may be varied in several respects to suit a particular user's needs and/or expectations. For example, a user may not wish to have the handedness setting changed repeatedly and so may simply choose to have a determined handedness persist, e.g., via selection through a graphical user interface. Alternatively, a user may frequently switch hands and want the handedness setting to switch frequently as well, in which case an embodiment may continue to dynamically switch the handedness. Additionally, an embodiment may provided customizability, e.g., requiring a higher or lower threshold of input(s) to be met prior to switching the handedness of the device. This would permit a user to modify how easily the handedness of the device is switched by requiring, e.g., more drastic changes in tilt angle, tilt angle changes lasting more than a predetermined time, changing handedness only in certain contexts, e.g., while in the home screen view but not while a particular application is open, e.g., web browser application, etc.

Accordingly, an embodiment permits a device itself to determine with which hand a user is holding a device and customize the output to the display interface accordingly. In an embodiment, after a particular handedness has been determined, the output to the display may be modified to make use of the device with that particular hand easier for the user.

For example, a device may reposition one or more icons, e.g., within a home screen, based on the handedness determined. Specifically, an embodiment may reposition one or more icons, e.g., frequently used icons as determined by a user history, to be in a position that is readily accessible for user provided touch input using the particular hand determined given the device form factor, the available touch screen display area available, the particular user's history of device use, etc. Thus, an embodiment may reposition one or more icons into predetermined area(s) that are known to be more readily accessible to a user holding a device with a particular hand. Likewise, an entire display layout may be reconfigured such that it is reorganized from the viewpoint of a particular user in mind (e.g., right handed user or left handed user). Thus, the overall design or layout of the touch interface may be reorganized such that it is most accessible a particular user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving one or more non-touch sensor inputs at an information handling device;
   determining, using a processor, that a user is holding the information handling device with a particular hand by determining an angle of the information handling device with respect to the user caused by a parallax, the angle indicating an orientation of the information handling device with respect to the user and being derived via the one or more non-touch sensor inputs; and
   adjusting output, based upon the particular hand and that the user is holding the information handling device with the particular hand for a predetermined amount of time, to a configuration of touch screen of the information handling device corresponding to the particular hand, wherein the adjusting comprises adjusting touch screen interface settings to reposition frequently used icons to touch screen locations accessible by the particular hand determined.

2. The method of claim 1, wherein the receiving one or more sensor inputs comprises receiving device orientation inputs via a sensor selected from the group consisting of an accelerometer of the information handling device, a gyroscope of the information handling device, and a compass.

3. The method of claim 2, wherein said determining comprises processing the device orientation inputs to dynamically determine that the user is holding the information handling device with a particular hand.

4. The method of claim 1, wherein said adjusting comprises adjusting icons within a display provided by the touch screen.

5. The method of claim 4, wherein said adjusting icons comprises repositioning one or more icons within the display.

6. The method of claim 5, wherein said repositioning one or more icons within the display comprises positioning the one or more icons into a predetermined area within the display.

7. The method of claim 6, wherein the predetermined area is mapped to an area determined to be accessible to the particular hand.

8. The method of claim 4, wherein said adjusting icons comprises reorganizing one or more icons within the display.

9. The method of claim 8, wherein said reorganizing one or more icons within the display comprises positioning the one or more icons into a predetermined organization within the display.

10. The method of claim 9, wherein the predetermined organization is mapped to an organization determined to be accessible to the particular hand.

11. An information handling device, comprising:
    one or more non-touch device sensors;
    a touch screen;
    a processor operatively coupled to the touch screen and the one or more non-touch device sensors;
    a memory device that stores instructions accessible to the processor, the instructions being executable by the processor to:
    receive one or more non-touch sensor inputs;
    determine that a user is holding the information handling device with a particular hand by determining an angle of the information handling device with respect to the user caused by a parallax, the angle indicating an orientation of the information handling device with respect to the user and being derived via the one or more non-touch sensor inputs; and
    adjust output, based upon the particular hand and that the user is holding the information handling device with the particular hand for a predetermined amount of time, to a configuration of touch screen of the information handling device corresponding to the particular hand, wherein the adjusting comprises adjusting touch screen interface settings to reposition frequently used icons to touch screen locations accessible by the particular hand determined.

12. The information handling device of claim 11, wherein:
    the one or more device sensors include a sensor selected from the group consisting of an accelerometer and a gyroscope; and
    to receive one or more sensor inputs comprises receiving device orientation inputs via one or more of the accelerometer and the gyroscope.

13. The information handling device of claim 12, wherein to determine comprises processing the device orientation inputs to dynamically determine that the user is holding the information handling device with a particular hand.

14. The information handling device of claim 11, wherein to adjust comprises adjusting icons within a display provided by the touch screen.

15. The information handling device of claim 14, wherein said adjusting icons comprises repositioning one or more icons within the display.

16. The information handling device of claim 15, wherein said repositioning one or more icons within the display comprises positioning the one or more icons into a predetermined area within the display mapped to an area determined to be accessible to the particular hand.

17. The information handling device of claim 14, wherein said adjusting icons comprises reorganizing one or more icons within the display.

18. The information handling device of claim 17, wherein said reorganizing one or more icons within the display comprises positioning the one or more icons into a predetermined organization within the display determined to be accessible to the particular hand.

19. The information handling device of claim 11, wherein the instructions are further executable by the processor to:
    accept user input selecting a handedness for the information handling device;
    wherein to adjust comprises adjusting output to the touch screen based on the input selecting a handedness.

20. A product, comprising:
    a storage device having processor executable code stored therewith, the code comprising:
    code that receives one or more non-touch sensor inputs at an information handling device;
    code that determines, using a processor, that a user is holding the information handling device with a particular hand by determining an angle of the information handling device with respect to the user caused by a parallax, the angle indicating an orientation of the information handling device with respect to the user and being derived via the one or more non-touch sensor inputs; and code that adjusts, based upon the particular hand and that the user is holding the information handling device with the particular hand for a predetermined amount of time, to a configuration of touch screen of the information handling device corresponding to the particular hand, wherein the adjusting comprises adjusting touch screen interface settings to reposition frequently used icons to touch screen locations accessible by the particular hand determined.

* * * * *